United States Patent
Hasegawa et al.

(10) Patent No.: US 10,078,466 B2
(45) Date of Patent: *Sep. 18, 2018

(54) WRITING FILES TO A STORAGE MEDIUM

(71) Applicant: International Business Machines Corporation, Armonk, NY (US)

(72) Inventors: Tohru Hasegawa, Tokyo (JP); Masayuki Iwanaga, Urayasu (JP); Yutaka Oishi, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/806,495

(22) Filed: Nov. 8, 2017

(65) Prior Publication Data

US 2018/0067681 A1 Mar. 8, 2018

Related U.S. Application Data

(63) Continuation of application No. 14/935,527, filed on Nov. 9, 2015, now Pat. No. 9,858,010.

(30) Foreign Application Priority Data

Dec. 2, 2014 (JP) .................................. 2014-244325

(51) Int. Cl.
*G06F 12/00* (2006.01)
*G06F 3/06* (2006.01)
*G11B 27/00* (2006.01)

(52) U.S. Cl.
CPC .......... *G06F 3/0643* (2013.01); *G06F 3/0611* (2013.01); *G06F 3/0682* (2013.01); *G11B 27/00* (2013.01)

(58) Field of Classification Search
CPC .... G06F 3/0643; G06F 3/0611; G06F 3/0682; G11B 27/00
See application file for complete search history.

(56) References Cited

U.S. PATENT DOCUMENTS 6,349,356 B2 * 2/2002 Basham ................ G06F 3/0611
711/111
2001/0034811 A1 10/2001 Basham et al.

FOREIGN PATENT DOCUMENTS

JP 08045182 A 2/1996
JP 08235675 A 9/1996
(Continued)

OTHER PUBLICATIONS

Hasegawa et al., "Method, Tape Device System, and Program for Writing Plurality of Files", Japan Application No. 2014-244325, filed Dec. 2, 2014, pp. 1-32.
(Continued)

*Primary Examiner* — Shawn X Gu
(74) *Attorney, Agent, or Firm* — James H. Mayfield; William H. Hartwell

(57) ABSTRACT

A method for writing a plurality of files includes receiving data of the plurality of files requested to be written to a tape from an application of a host, dividing a group of the received plurality of files into segments with specified sizes, and writing a series of the plurality of respective segments of the group of the plurality of files in sequence in a specified order, the respective segments having the specified sizes, wherein when writing the segments in the specified order, a left end portion of the tape is positioned and respective top segments of the files are first collectively written thereto.

18 Claims, 5 Drawing Sheets

(56) References Cited

FOREIGN PATENT DOCUMENTS

| | | | |
|---|---|---|---|
| JP | 2000201325 A | 7/2000 |
| JP | 2001014110 A | 1/2001 |
| JP | 2002208222 A | 7/2002 |
| JP | 2007073108 A | 3/2007 |
| JP | 2008310895 A | 12/2008 |
| JP | 2010152603 A | 7/2010 |
| JP | 2013191259 A | 9/2013 |
| JP | 2014063550 A | 4/2014 |

OTHER PUBLICATIONS

Hasegawa et al., "Writing Files to a Storage Medium", U.S. Appl. No. 14/935,527, filed Nov. 9, 2015, 32 pages.
IBM Appendix P, list of patents and patent applications treated as related, filed herewith, 2 pages.
"Notification of Reasons for Refusal" (translation), Patent Application No. 2014-244325, Date of Drafting: Heisei 30(2018) Jul. 23, 3564 5C00, Representative/Applicant, UENO, Takeshi (and 1 others), Applied Provisions: Article 36, 4 pages.

* cited by examiner

Schematic view in case where plurality of motion picture files are fragmented and top portions of files are collectively written to beginning of even Wrap

WRITING FILES TO A STORAGE MEDIUM

BACKGROUND OF THE INVENTION

The present invention relates to a method for writing a plurality of files to a tape (a tape medium or a tape cartridge). The present invention more particularly relates to a writing method capable of reducing an average time for file position seek (or file seek) in reading of a plurality of files stored on a tape.

The time required for a tape drive to retrieve a data piece on a tape medium is dependent on a length of the tape medium. The length of the tape medium is about 800 m, and a running speed of the tape medium is about 10 m/sec at a maximum. An average time required for retrieving the data which is at an arbitrary position in the tape medium is about tens of seconds. It takes about two seconds at most to move across wraps, and an operation of retrieving a piece of data stored on the tape is performed in parallel with movement of the tape in a longitudinal direction. Accordingly, the time taken for data retrieval is typically determined by the moving time of the tape in the longitudinal direction.

SUMMARY

As disclosed herein, a method for writing a plurality of files that reduces average seek time includes receiving data of the plurality of files requested to be written to a tape from an application of a host, dividing a group of the received plurality of files into segments with specified sizes, and writing a series of the plurality of respective segments of the group of the plurality of files in sequence in a specified order, the respective segments having the specified sizes, wherein when writing the segments in the specified order, a left end portion of the tape is positioned and respective top segments of the files are first collectively written thereto. A tape drive system in which the method for writing is implemented can reduce an average time required for seek of a plurality of image files.

DETAILED DESCRIPTION

A later-described linear tape file system (LTFS) has been introduced as a file system for tape devices. This system enables the tapes to be used via the file system like USB memory devices. Tapes are excellent for long-term storage (archive) and for large capacity storage. User industries which have not used tapes in the past are coming to use tape cartridges for long-term storage and reproduction of the files handled by applications of each industry.

Figure 1:
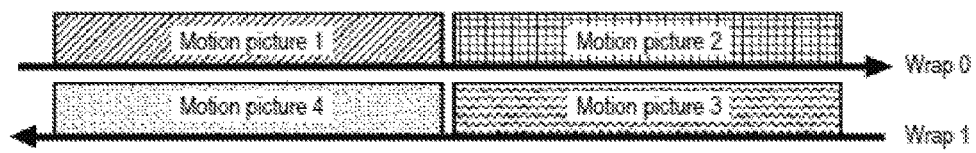
FIG. 1 is a schematic view of a plurality of motion picture files written to a tape medium.

FIG. 1 is a schematic view of a plurality of motion picture files written to a tape.

In the broadcasting industry, a large amount of picture files with a file size of several to tens of GB are stored on one tape. In reading of motion picture files on the tape, it does not take time to perform file seek (or the seek of the file-beginning) of a motion picture 1. However, it takes about 40 seconds in the case of motion pictures 2 and 4, and takes about 80 seconds in the case of a motion picture 3. Here, the motion pictures are typically picture files such as movies. When motion picture files are written to/read from the tape, the motion pictures 1 and 2 on a wrap 0 are read and written from the left side to the right side, whereas the motion pictures 3 and 4 on a wrap 1 are read and written from the right side to the left side. Immediately after the tape is inserted into a tape drive, a read/write head is positioned at the beginning of the wrap 0, i.e., at the left end of the wrap 0. This means that in reading of the motion picture files on the tape, it does not take time to perform the file seek (cueing) of the motion picture 1, whereas it takes about 40 seconds in the case of the motion pictures 2 and 4, and takes about 80 seconds in the case of the motion picture 3. As described above, it is assumed that the tape length is 800 m and the running speed is 10 m/sec. In the case of the motion pictures 3 and 4 on an odd wrap, writing and reading are performed from the right side to the left side on the wrap 1, so that it is necessary to search the position of the right end. Therefore, an average time required for file seek is about 40 seconds. This average time value required for file seek is applied not only to the case of FIG. 1 but also to the case where the file size is arbitrary. An object of the present invention is to reduce the average time required for file seek.

In the description of conventional tape devices, there is no reference about the writing which can averagely reduce the time required for file seek in consideration of all the plurality of files. To promote use of tape storage, it is necessary to solve the problem in media industry (picture industry) in particular.

An object of the present invention is to provide a writing method, a tape device system, and a program capable of reducing an average time for file seek in writing and reading of a plurality of files to/from a tape.

To accomplish the above object, the present invention is a method for writing a plurality of files so that an average time for seek of the plurality of files stored on a tape can be reduced via a file system for tape devices. The method for writing includes the steps of: (a) receiving data of the plurality of files requested to be written to a tape from an application of a host; (b) dividing a group of the received plurality of files into segments having specified sizes; and (c) writing a series of the respective segments of the group of the plurality of files in sequence in a specified order, the respective segments having the specified sizes, wherein (d) the step (c) of writing the segments in the specified order includes searching a position of a left end portion of the tape in one or more wrap round-trips and starting to write respective top segments of the files.

In the method for writing, the step (c) of writing the segments in the specified order in (d) further includes searching a position of a left end portion of an even wrap of the tape and starting to write respective top segments of the files thereto.

In the method for writing, the step (c) of writing the segments in the specified order in (d) further includes searching a position of a left end portion of an odd wrap of the tape and starting to write respective last segments of the files thereto.

In the method for writing, the respective segment sizes of the plurality of files in (b) are determined such that written data of each segment of the plurality of files fits into a capacity in units of wrap round-trips in the tape.

In the method for writing, the respective segment sizes of the plurality of files in (b) are determined so as to be equal to or less than a maximum allowable segment size calculated, based on a maximum time required for file seek that allows the plurality of files to be accessed.

In the method for writing, the segment sizes of the plurality of files in (b) are equal to or less than the maximum allowable segment size and are different between the files.

In the method for writing, in the step (c) of writing the respective segments of the plurality of files in the specified order (pattern), the segments of each file are inserted into a data set and written in sequence in round-robin fashion when the file sizes are identical (i.e., uniform).

In the method for writing, the specified order (pattern) in writing of the respective segments of the plurality of files in the step (c) is determined in consideration that the files with different file sizes are mixedly present.

In the method for writing, the specified order (pattern) in writing of the respective segments of the plurality of files in the step (c) is determined based on a ratio of total capacity of written segments to the file size in each file.

In the method for writing, the specified order (pattern) in writing of the respective segments of the plurality of files in the step (c) is determined so that the segments of the files are written in order of the files lower in ratio of the capacity of the written segments.

Furthermore, to accomplish the above object, the present invention is a tape device system for executing each step in the aforementioned method for writing.

Furthermore, to accomplish the above object, the present invention is a computer program product for causing the tape device system to execute each step in the aforementioned method for writing.

The tape drive to which the aforementioned present invention is applied can reduce the time required for seek of a plurality of files written onto the tape.

A description is given of an embodiment of a method for writing a plurality of files in the form of a plurality of segments in a tape device system connected to a host.

The present invention reduces the time required for file seek by fragmenting each of the plurality of files and placing the top and end segments of each file at the left end of a tape medium.

In the embodiment of the present invention, files to be written to a tape are fragmented, and top portions of the files are collectively written to the vicinity of the beginning of an even wrap or to the vicinity of the end of an odd wrap so as to reduce the time required for file seek.

Figure 2A:
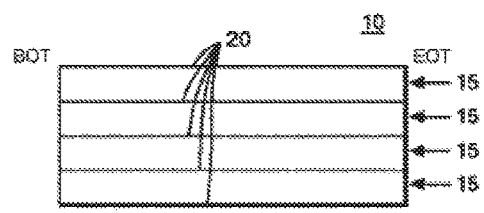
FIGS. 2A-2C illustrate a format wherein reciprocal read and write access is repeated in a longitudinal direction of a tape.
Figure 2B:
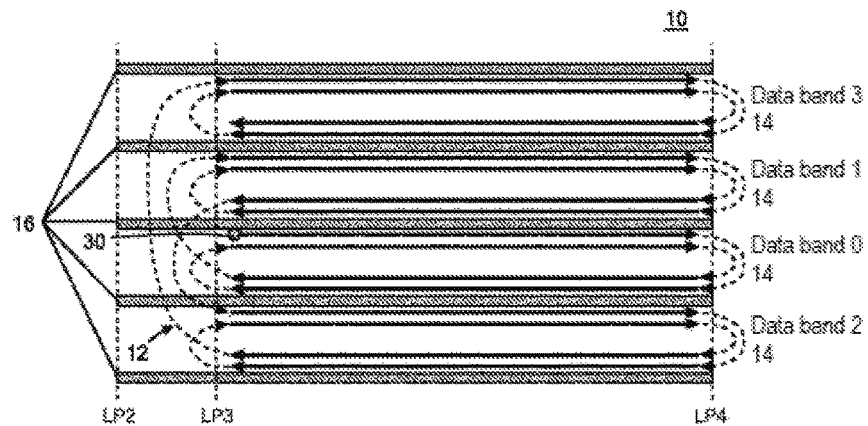
Figure 2C:
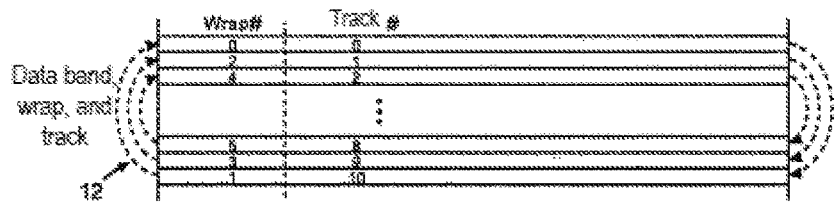
Figure 5:
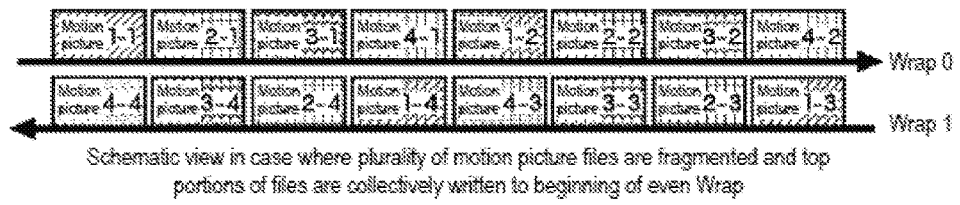
FIG. 5 illustrates a specific write mode as an embodiment of the present invention.

In FIG. 5, four files of motion pictures 1 to 4 are each divided into a plurality of segments. Each file is written to the tape in the fragmented form so that the top segments of the files are gathered at the beginning of a wrap 0. The files to be written to the tape are segmented, and the top portions of the files are collectively written to the vicinity of the beginning of an even wrap or to the vicinity of the end of an odd wrap FIGS. 2A-2C illustrates a format wherein reciprocal read and write access is repeated in a longitudinal direction of a tape.

In the description of the embodiment of the present invention, a tape read/write format is used to describe file data writing and a tape drive mechanism in the LTFS.

When data is written to a tape medium, the tape drive sequentially writes the data from the beginning of the tape. The tape drives of Linear Tape Open (LTO) and IBM TS1120™ employ a format wherein reciprocal read and write access is repeated in a longitudinal direction of the tape.

In the existing format, change or reversal (wrap turn) of the running direction of the tape is always performed at specified positions: at the end on both sides of the longitudinal direction or in the vicinity thereof (LP3 and LP4).

Although the present invention is described with a tape device of the LTO standard as an example, application of the present invention is not limited to tape devices of the LTO standard nor host devices connected to the tape devices. The present invention is effective for any tape drive that records data by reciprocally running a tape medium in its longitudinal direction.

FIG. 2A illustrates the configuration of a recording area of a tape medium in accordance with the LTO standard.

With reference to FIG. 2A, a method for writing data is described. In FIG. 2A, a tape medium 10 has a plurality of bands 15 placed along the longitudinal direction of the tape medium 10 extending from the beginning of tape (BOT) to the end of tape (EOT). On both sides of each of the plurality of bands 15, a servo track 20 is provided along the longitudinal direction for controlling a data write position.

FIG. 2B illustrates the layout of a LTO Ultrium format for the tape used in the present invention.

As illustrated in the drawing, the tape medium 10 of the linear tape open (LTO) standard adopts a linear recording method whereby data tracks are provided in a direction parallel to the longitudinal direction of the tape. A width direction of the tape medium 10 is divided into four data bands 14 which are inserted in between the respective servo bands 16. Four data bands 14 are numbered. Data is buried in the data bands in order of the allotted numbers. In the longitudinal direction of the tape medium, the data bands are divided into a plurality of areas at a plurality of logical points (LPs). FIG. 2 illustrates LP2, LP3, and LP4, the LP3 and LP4 defining a user data area.

Data is written along a forward-direction path extending from the beginning of tape (BOT) to the end of tape (EOT) and a backward-direction path extending from the end of tape (EOT) to the beginning of the tape (BOT). The paths are also referred to as wraps. One data band includes a plurality of wraps.

Once the head reaches the EOT in the forward-direction path, the head is vertically moved and is positioned at a lower portion of the same data band to start writing in the backward direction. By repeating this operation, a large capacity of data can be recorded on one tape. Because of such a reciprocating motion 12, made up of recording along the running direction of the tape from the beginning of the recording area of the tape, turning back at the end of the recording area, and recording again toward the beginning of the tape, this recording method may also be referred to as a serpentine recording method.

In the above format, when a tape medium is mounted, data is written from the beginning of tape (BOT) side. When a file is written from the position close to the logical point (LP3) on the BOT side, it is possible to read the file in a short period of time since a moving distance from the BOT, which is necessary for cueing the file, is short. Contrary to this, when a file is written to the position close to the logical point (LP4) that is a turn position on the end side (EOT) of the longitudinal direction of the tape, it takes long time to start reading the file since the moving distance necessary for cueing is long.

FIG. 2C illustrates a wrap structure or a track structure of one data band accessed by the head having one read/write channel.

It is indicated that once the tape cartridge is mounted on the tape drive, data is written to the position of the logical point (LP3) which is slightly behind the logical point LP2. The data is not written from the LP2 (LP: logical position) that is the BOT of the tape medium 10. For the tape medium 10 having such a recording area structure, the tape device in conformity with the LTO standard writes data in sequence from the beginning of the tape medium 10.

One data band is made up of eleven wraps or tracks. These eleven tracks are accessed by one channel which changes its direction during the access. As illustrated by arrows, the head accesses an outermost physical track at first. Once the head reaches the end of the track, i.e., the tape, the head turns and accesses a track on the opposite side. Whenever the head reaches the end of the tape, the tape changes its course from an outer track to an inner track to access these tracks in order. A track number (Track#) is determined depending on the physical position of the track on the tape. A wrap number (Wrap#) is allotted in order of access to the physical position on the same tape. When Wrap# is even, read and write access is made from LP3 to LP4, while when Wrap# is odd, read and write access is made from LP4 to LP3. In the method for writing in the present invention described below, a pair of even and odd wraps, such as Wrap#0 and Wrap#1, constitute a reciprocating data set.

When data is written to the tape 10 for the first time, the data is written toward LP4 from a position 30 (in the vicinity of LP3 in the data band 0) illustrated in FIG. 2B. Once the data is written up to the end of the tape 10, the tape running direction is reversed (wrap-turned) to the direction of LP4 to LP3 as illustrated by FIG. 2B, and data writing is continued. To append new data, the tape device writes the data at the position next to the last data written to the tape 10.

The positions of the logical points are stored in a non-volatile memory (CM: Cartridge Memory) attached to a cartridge. Each area where data is written toward LP4 from LP3 or toward LP3 from LP4 is called a wrap. A plurality of wraps are identified by numbers. Each wrap may also be referred to as a data track (track). The change (reversal) in tape running direction is referred to as wrap turn. The tape drive reconstructs variable-length data sent by the host into a fixed-length unit called a data set (DS), and writes the data set onto the tape medium. Each DS holds meta information on the data set called a data set information table (DSIT).

At the time of starting data writing for the first time, the data is written from the vicinity of LP3 in a wrap with even number 0 (Wrap#0). At the time of appending new data, data is sequentially written to the position next to the last written data. Since the tape drive is a sequential access device, data cannot be placed in an arbitrary position for enhancement of access speed.

In the case of accessing data other than the first written data, the top of the data is equivalent to the arbitrary position. More specifically, the desired data is not necessarily placed in the vicinity of LP3, and therefore it takes time to perform seek of the tape. In the LTO, it takes about two minutes to move the head from the current LP3 position to the vicinity of LP4.

Since the tape device is a sequential access device, it sequentially records data while moving back and forth in the longitudinal direction of the tape medium 10. Accordingly, the top of data other than the first written data is positioned at an arbitrary position on the tape medium 10. As a consequence, in the case of reading and appending data, the position of the top of the data to be read, and/or the position of next data to be written are not necessarily at the beginning of the tape medium 10. When the desired data is not at the beginning of the tape, it is necessary to run the tape medium 10 to a target position. As a result, it takes time to perform seek.

Figure 3:
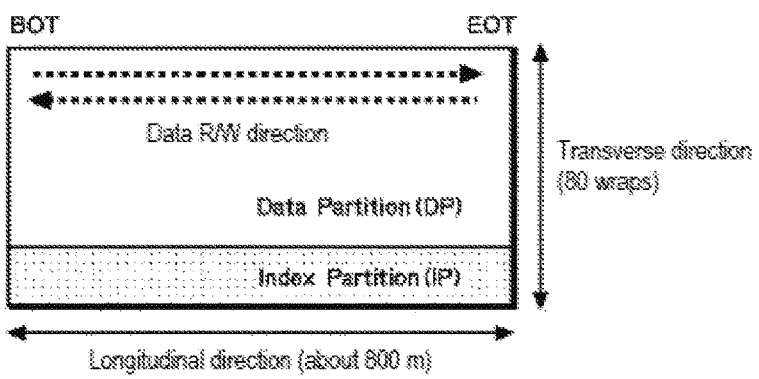
FIG. 3 illustrates a format wherein a tape is divided into two partitions by the LTFS.

FIG. 3 illustrates a format wherein a tape is divided into two partitions by the LTFS.

An LTO5 tape drive writes data while reciprocating on wraps in the writing area located along the longitudinal direction of the tape. In the LTFS, two wraps (one round-trip) are used as an index partition. An area between the beginning of tape (BOT) and the end of tape (EOT) is divided into an index partition (IP) and a data partition (DP). Tracks are units simultaneously read and written by the head. Sixteen tracks correspond to one wrap. In the LTO5 tape cartridge, a tape length in the longitudinal direction is about 800 m, and a tape length in a transverse direction is equal to the width of eighty wraps. IP and DP are separated by a guard band constituted of two wraps. The tape moves back and forth in the longitudinal direction of the wraps, and reversal in moving direction at the BOT and the EOT is referred to as wrap turn. The time taken for the tape drive head to move from the BOT to the EOT in the longitudinal direction of the tape is about 60 to 90 seconds. The time taken to move half the longitudinal length of the tape is about 30 to 45 seconds.

The file system for tape drives, such as LTFS, can show the data written onto a medium as files. When a user writes data to a tape by using the LTFS, not only a file body but also meta information called an index file (or simply called an index) are written to the tape. The index includes meta information, such as a directory name, a filename, and a file generation date, and also includes position meta information, such as a position on the medium, a size, and an offset inside the file, in an XML format. When one file is divided into a plurality of segments, the index also includes meta information relating to the segments. The IP stores mainly the latest index. File bodies added and changed in sequence and a history of the indexes relating thereto are appended to the DP of the medium.

When the LTFS is used to read and write files from/onto the tape, data are read and written in units called records. In the LTFS, the records are called blocks, and an LTFS format is imparted thereto. The blocks are numbered from the top block in each partition which has file data recorded thereon, and are managed by using the allotted numbers. The index file includes position information indicative of the block number for the file data.

Figure 4:
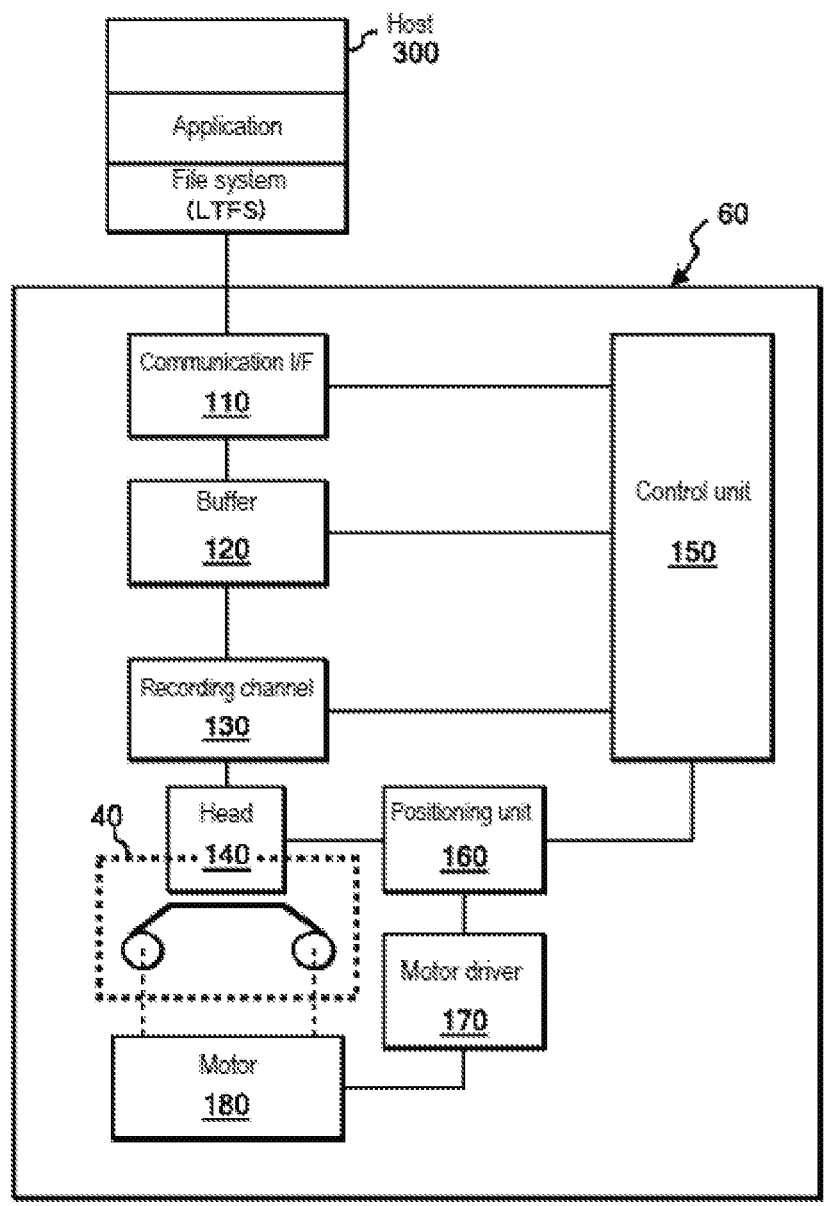
FIG. 4 illustrates a hardware configuration of a tape storage system (tape device system) including a tape device connected to a host.

FIG. 4 illustrates the hardware configuration of a tape device system including a tape drive (tape device) connected to a host.

A tape drive 60 receives a file read/write request from an application of a host 300 via a file system (LTFS). The tape drive includes a communication interface (I/F) 110, a buffer 120, a recording channel 130, a read/write head 140, a control unit 150, a positioning unit 160, a motor driver 170, and a motor 180.

The interface 110 performs communication with the host 300 via a network. For example, the interface 110 receives from the host 300 a write command which instructs data writing to a tape cartridge (medium) 40. The interface 110 also receives from the host 300 a read command which instructs data reading from the medium 40. The interface 110 has functions of compressing write data, and decompressing read data for making the memory capacity of the medium approximately twice as large as actual data.

The tape drive 60 performs read and write access to the medium 40 in units of data sets (referred to as DSs) each of which are constituted of a plurality of records sent from the application of the host 300. The DS typically has a size of 4 MB. The application of the host 300 uses a file system (for example, LTFS-API (Application Program Interface)) to select a file name and to issue to the tape drive 60 a read and write access. The file system sends to the tape drive a record write/read request on the level of a SCSI command. The DS is constituted of a plurality of records.

Each DS includes management information on the data set. User data is managed in units of records. The management information is included in a data set information table (DSIT). The DSIT includes the number of records or blocks included in the DS, and the number of file marks (FMs), and further includes the cumulative number of records written from the top of the medium, and the cumulative number of FMs.

The buffer 120 is a memory which temporarily stores the data to be written to the medium 40, and the data read from the medium. For example, the buffer 120 is constituted by a dynamic random access memory (DRAM). The recording channel 130 is a communication path used to write the data stored in the buffer 120 to the medium 40, or to temporarily store the data read from the medium 40 in the buffer 120.

The read/write head 140 has a data read/write element for writing data to the medium 40 and reading data from the medium 40. The read/write head 140 according to the present embodiment also has a servo read element for reading a signal from the servo track provided on the medium 40. The positioning unit 160 instructs movement of the read/write head 140 in a short direction (width direction) of the cartridge 40. The motor driver 170 drives the motor 180.

The tape drive 60 writes data to the tape and/or reads data from the tape in response to the command received from the host 300. The tape drive 60 includes a buffer, a read/write channel, a head, a motor, a reel for winding the tape, a read/write control, a head position control system, and a motor driver. The tape drive detachably houses a tape cartridge. As the reel rotates, the tape moves in the longitudinal direction. The head moves in the longitudinal direction of the tape to write data and/or read data from the tape. The tape cartridge 40 includes a non-contact nonvolatile memory called a cartridge memory (CM). The CM mounted on the tape cartridge 40 receives read and write access from the tape drive 60 in a non-contact manner. The CM stores a cartridge attribute. At the time of reading and writing, the tape drive extracts the cartridge attribute from the CM so that optimum reading and writing can be performed.

The control unit 150 controls the entire tape drive 60. More specifically, the control unit 150 controls data writing to the medium 40 and data reading from the medium 40 in response to the command received in the interface. The control unit 150 also controls the positioning unit 160 in response to the read signal from the servo track. The control unit 150 further controls operation of the motor via the positioning unit 160 and the motor driver 170. The motor driver 170 may directly be connected to the control unit 150.

FIG. 5 illustrates a specific write mode as an embodiment of the present invention.

The drawing illustrates a schematic view in the case where a plurality of motion picture files are fragmented and top portions of the files are collectively written to the beginning of an even wrap.

Four files of the motion pictures 1 to 4 illustrated in FIG. 1 are each divided into a plurality of segments (motion pictures N-M: N, M=1, 2, 3, 4). Each file is written to the tape in the fragmented form so that the top segments of the files are gathered at the beginning of the wrap 0.

FIG. 5 illustrates the case where each file is divided into four segments (motion pictures N-1 to N-4), and the top segments (motion pictures N-1: N=1, 2, 3, 4) of the respective files are collectively written to the beginning of the wrap 0. When the data drive reads and writes data from/onto the tape, the data is read and written in a fixed-length unit called a data set (DS) which has a capacity of several MB. For example, the size (capacity) of the segment is determined so that the segments of all the files are stored in one data set. If the first data set includes all the first segments of the files, all the files can be searched in the access to one data set, so that the time required for seek of all the files can be made equal to the time required for seek of the conventional top file (motion picture 1 in FIG. 1).

Furthermore, by writing each of the files onto the tape as illustrated in FIG. 5, the end portions of each of the files are collectively positioned at the end of the wrap 1. In the case of reading one arbitrary file after the end of reading another arbitrary file, the time required for seek of the one arbitrary file may be made to be approximately zero. Technically, some time (several seconds) is expected to be needed for reversal of the running direction of the tape and the like. However, the conventional average time required for seek is about 40 seconds, and as compared with the time, significant reduction can be achieved.

The time required for file seek can be reduced as in the case after a tape cartridge is inserted to and mounted on the tape drive. Furthermore, even immediately after one file is read from or written onto the tape, applying the present invention can make the time required for seek of the beginning of another file to be approximately zero.

If the segment size is too small, the overhead of a write/read command protocol is increased when the tape drive reads and writes the data from/onto the tape. When the segment size is too small at the time of dividing a plurality of files (for example, motion pictures), the read overhead is increased. Accordingly, a maximum allowable segment size is calculated. When the time allowed as a difference between a minimum time required for file seek and a maximum time required for file seek is defined as D, a running speed of the tape as S, a capacity of DS as C, a length of DS as L, and the number of files to be written during wrap round-trip as N, a maximum segment size X which satisfies the allowed time D can be defined by the following formula:

$$X = C \times (S \times D/L)/N \qquad \text{(Formula 1)}$$

The segment size may be a fixed value, such as 512 KB, for example. Values of the segment size may be different between files as long as the values are smaller than the value calculated by the formula 1. When the file sizes and segment sizes are uniform, the segments may sufficiently be written in sequence in round-robin fashion. Files different in file size may also be mixedly present depending on operating environments. When each file is different in segment size, a ratio of the total capacity of written segments to the file size may be evaluated in each file, and the size and order of subsequent files may be changed accordingly. For example, the segments of the file which is lower in the ratio of the capacity of the written segments may preferentially be written to the tape.

Figure 6:
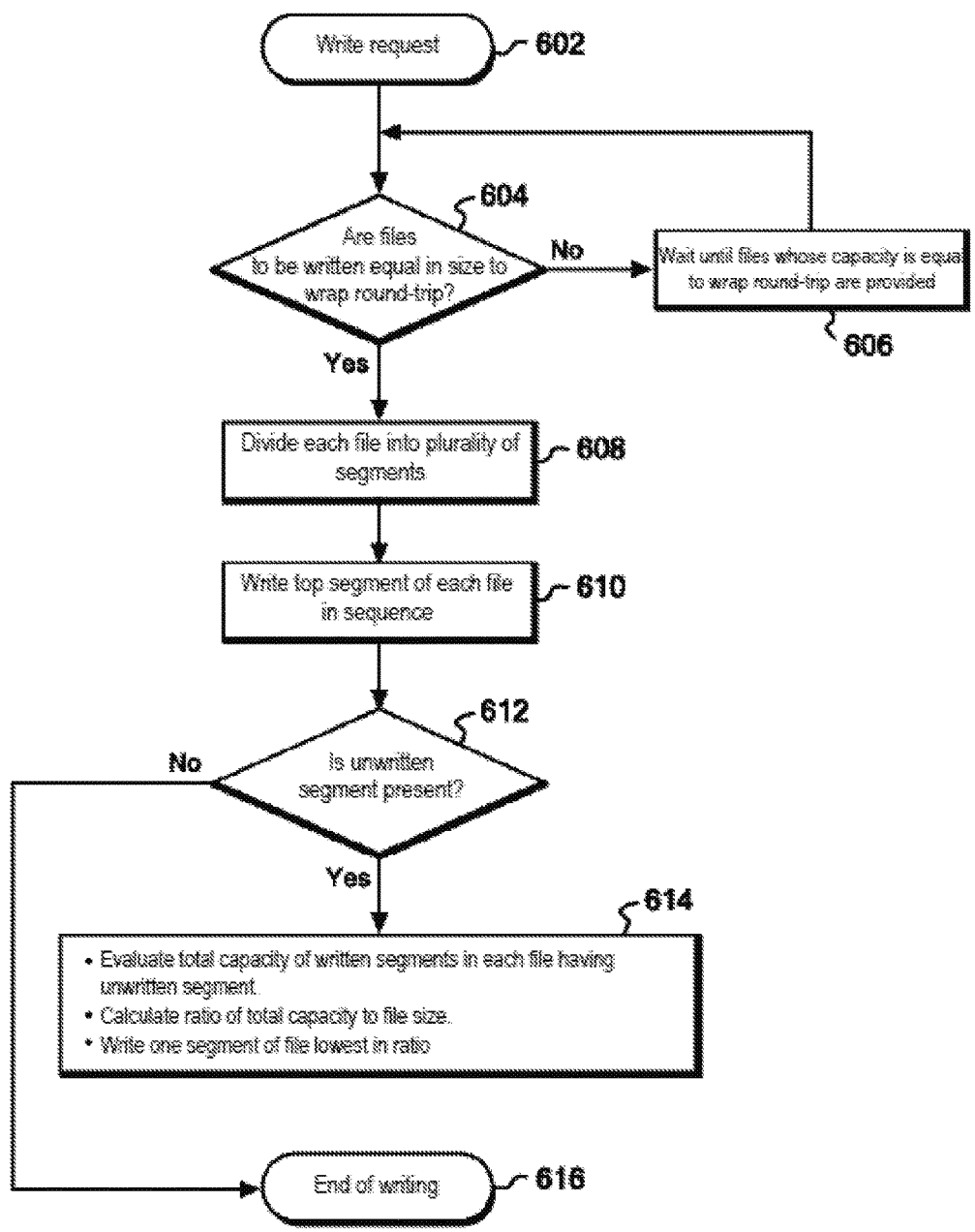
FIG. 6 illustrates a typical write flow chart for implementing the present invention.

FIG. 6 illustrates a typical write flow chart for implementing the present invention.

For example, in a user environment where a plurality of picture files are stored on one tape, the time required for seek of an arbitrary picture file can be reduced to the level of the file stored at the beginning of the conventional tape. Meanwhile, the file read time increases in exchange for reduction in the time required for file seek. A description thereof is given by taking FIGS. 1 and 5 as example. That is, all the parts of each file are collectively written in the conventional case as illustrated in FIG. 1. However, by applying the present invention, the parts of each file are scattered over the tape as illustrated in FIG. 5.

When a request for writing a plurality of files is received, the file system (LTFS) divides each file into segments. The file system writes the files to the tape drive so that the segments of each file are mixedly present in a specified pattern (order). The similar processing may be executed by an application which uses the LTFS.

(602) It is the case where the file system (LTFS) receives a write request from the application of the host.

(604) The LTFS confirms whether or not the size of a plurality of files to be written is equal to the capacity of two wraps (wrap round-trip) or the capacity of a plurality of wrap round-trips.

The case where the size of a plurality of files received from the application fits into the capacity of a plurality of wrap round-trips is described as a typical embodiment. In this case, the first segment and the last segment can be written to the vicinity of the left end portion (for example, LP3) of a wrap. Therefore, by positioning a next group of a plurality of files at the left end of a wrap, an advantageous effect of reducing the time required for continuous read/write of files can be maintained.

(606) The file system waits until the files, whose capacity is equal to one or more wrap round-trips, are provided.

The file system continuously receives a plurality of files until the total size of the files to be written reaches the level of one or more wrap round-trips (No in 604).

(608) When the total size of the files to be written reaches the level of one or more wrap round-trips (Yes in 604), the received files are each divided into a plurality of segments.

The segment size of each file is determined to be a specified size so that the data of the plurality of files is fit into the wrap round-trip. The plurality of files may each be fit into different wrap round-trip. For example, when two files (file1, file2) are received, the segments of the file1 may be written in one wrap in the first wrap round-trip, and the segments of the file2 may be written in the other wrap in the first wrap round-trip.

(610) The file system writes the top segments of respective files to the tape drive in sequence.

The file system writes the segments of a plurality of files in a specified order (pattern). The specified order is typically a round robin order, but is not limited thereto. The files lower in the ratio of segments written to the wrap may preferentially be written.

(612) The file system confirms whether or not an unwritten segment is present.

It may be confirmed that the end segment in each file is not yet written.

(614) When an unwritten segment is present (Yes in 612), the total capacity of the written segments is evaluated in each file. Furthermore, a ratio of the written capacity to the file size in each file is calculated. Finally, the file system selects to write one segment lowest in the ratio as in the specified order.

(616) When there is no unwritten segment (No in 612), writing is ended.

The file system can confirm the end of writing by confirming that the end segment in each file is written to the wrap.

The tape device system with the present invention applied thereto is characterized in that a plurality of relatively large files are gathered and are written with their file segments being intermingled. This characteristic configuration can provide the advantageous effect that the average seek time of a plurality of files, such as a plurality of picture files, can be reduced.

In the environment where only the files small in file size are used, that is, in the case of the conventional files which can be read by moving only one side (one wrap) of the tape for example, it is hard to obtain the advantage of the present invention. Applying the present invention increases the necessity of reciprocating the tape for reading the files, and therefore prompt positioning of a plurality of files can be secured, while the read time becomes longer.

However, in the field where application of the present invention is averagely secured for cueing of a plurality of files, the tape device system to which the present invention is applied is useful. Such a field includes the case of using the tape via the cloud and the case of reproducing motion pictures stored on the tape. In reproduction of motion pictures, increase in time required for file read after file seek does not pose a problem in the environment where the low transfer rate during the file read does not affect subsequent processing. In the past, file data is read from the tape to the tape drive buffer memory at relatively high speed, and then the tape drive waits until the data is sent to the host. As for the data stored in the buffer memory, the transfer speed from the tape to the buffer memory is lowered, but the transfer speed from the tape drive buffer to the host is not affected.

A description has been given of the case where a plurality of files are stored in the capacity of one wrap round-trip. However, processing may be performed not in each round-trip but in each of a plurality of round-trips. For example, two files each having the capacity of a round trip of 1.5 wraps may be combined so that the end portions of their files are aligned after three round-trips. Furthermore, the files to be written at the same time may have different start points and end points. For example, the file 1, the file 2, and the file 3 are written so as to position in Wrap0 to Wrap1, Wrap0 to Wrap3, and Wrap2 to Wrap3, respectively.

As described in the foregoing, the time required for seek of each file written onto the tape can be reduced by applying the present invention. Although the present invention has been described with the embodiment, the technical scope of the present invention is not limited to the embodiment disclosed. It is apparent to those skilled in the art that various arrangements and modifications shall be adopted without departing from the spirit and scope of the present invention. It should be noted that a computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

What is claimed is:

1. A method for writing a plurality of image files capable of reducing an average time for seek of the plurality of files stored on a tape, comprising:
receiving data of the plurality of files from an application of a host;
dividing a group of the plurality of files into segments having specified sizes; and
writing a series of the segments of the group of the plurality of files in sequence in a specified order, the segments having the specified sizes, wherein the writing of the series of the segments in the specified order comprises collectively writing respective top segments of the group of the plurality of files to a beginning portion of a tape, wherein the respective segment sizes of the group of the plurality of files have different sizes, and wherein the specified order in writing the segments of the group of the plurality of files is determined based on a ratio of total capacity of written segments to file size in each file.

2. The method of claim 1, wherein the writing of the series of the segments of the group of the plurality of files in sequence in the specified order further comprises starting to collectively write respective top segments of the group of the plurality of files to a beginning portion of an even wrap of the tape.

3. The method of claim 1, wherein the writing of the series of the segments of the group of the plurality of files in sequence in the specified order further comprises starting to collectively write respective last segments of the group of the plurality of files to a beginning portion of an odd wrap of the tape.

4. The method of claim 1, wherein the respective segment sizes of the group of the plurality of files are determined such that written data in each segment of the group of the plurality of files fits into a capacity in units of wrap round-trips of the tape.

5. The method of claim 1, wherein the respective segment sizes of the group of the plurality of files are determined so as to be equal to or less than a maximum allowable segment size calculated, based on a maximum time required for file seek that allows the group of the plurality of files to be accessed.

6. The method of claim 5, wherein the segment sizes of the group of the plurality of files are equal to or less than the maximum allowable segment size calculated and are different between the group of the plurality of files.

7. The method of claim 1, wherein writing the series of the plurality of respective segments of the group of the plurality of files in sequence in a specified order further comprises inserting segments of each file into a data set in sequence in round-robin fashion when file sizes are identical.

8. The method of claim 1, wherein the segments of the group of the plurality of files are written in order of files lower in ratio of total capacity of written segments to file size in each file.

9. A tape device system, the tape device system comprising:
one or more computer processors;
one or more computer readable storage media;
program instructions stored therein for execution by at least one of the one or more computer processors, the program instructions comprising instructions to:
receive data of a plurality of files from an application of a host;
divide a group of the plurality of files into segments having specified sizes; and
write a series of the segments of the group of the plurality of files in sequence in a specified order, the segments having the specified sizes, wherein the writing of the series of the segments in the specified order comprises collectively writing respective top segments of the group of the plurality of files to a beginning portion of a tape, wherein the respective segment sizes of the group of the plurality of files have different sizes, and wherein the specified order in writing the segments of the group of the plurality of files is determined based on a ratio of total capacity of written segments to file size in each file.

10. The tape device system of claim 9, wherein the instructions to write the series of the segments of the group of the plurality of files in sequence in the specified order further comprises instructions to start to collectively write respective top segments of the group of the plurality of files to a beginning portion of an even wrap of the tape.

11. The tape device system of claim 9, wherein the instructions to write the series of the segments of the group of the plurality of files in sequence in the specified order further comprises instructions to start to collectively write respective last segments of the group of the plurality of files to a beginning portion of an odd wrap of the tape.

12. The tape device system of claim 9, wherein the respective segment sizes of the group of the plurality of files are determined such that written data in each segment of the group of the plurality of files fits into a capacity in units of wrap round-trips of the tape.

13. The tape device system of claim 9, wherein the respective segment sizes of the group of the plurality of files are determined so as to be equal to or less than a maximum allowable segment size calculated, based on a maximum time required for file seek that allows the group of the plurality of files to be accessed.

14. A computer program product, the computer program product comprising:
a computer readable storage medium and program instructions stored on the computer readable storage medium, the program instructions comprising instructions to:
receiving data of a plurality of files from an application of a host;
dividing a group of the plurality of files into segments having specified sizes; and
writing a series of the segments of the group of the plurality of files in sequence in a specified order, the segments having the specified sizes, wherein the writing of the series of the segments in the specified order comprises collectively writing respective top segments of the group of the plurality of files to a beginning portion of a tape, wherein the respective segment sizes of the group of the plurality of files have different sizes, and wherein the specified order in writing the segments of the group of the plurality of files is determined based on a ratio of total capacity of written segments to file size in each file.

15. The computer program product of claim 14, wherein the instructions to write the series of the segments of the group of the plurality of files in sequence in the specified order further comprises instructions to start to collectively write respective top segments of the group of the plurality of files to a beginning portion of an even wrap of the tape.

16. The computer program product of claim 14, wherein the instructions to write the series of the segments of the group of the plurality of files in sequence in the specified order further comprises instructions to start to collectively write respective last segments of the group of the plurality of files to a beginning portion of an odd wrap of the tape.

17. The computer program product of claim 14, wherein the respective segment sizes of the group of the plurality of files are determined such that written data in each segment of the group of the plurality of files fits into a capacity in units of wrap round-trips of the tape.

18. The computer program product of claim 14, wherein the respective segment sizes of the group of the plurality of files are determined so as to be equal to or less than a maximum allowable segment size calculated, based on a maximum time required for file seek that allows the group of the plurality of files to be accessed.

\* \* \* \* \*